United States Patent [19]

Sleger

[11] Patent Number: 4,812,935
[45] Date of Patent: Mar. 14, 1989

[54] APPARATUS FOR DAMPING HEAD POSITIONERS FOR DISC DRIVES

[75] Inventor: Roger R. Sleger, Meridian, Id.

[73] Assignee: Hewlett-Packard Company, Palo Alto, Calif.

[21] Appl. No.: 114,253

[22] Filed: Oct. 26, 1987

Related U.S. Application Data

[63] Continuation of Ser. No. 788,282, Oct. 16, 1985, abandoned.

[51] Int. Cl.⁴ .............................................. G11B 5/55
[52] U.S. Cl. ...................................................... 360/106
[58] Field of Search ......................................... 360/106

[56] References Cited

U.S. PATENT DOCUMENTS

| | | | |
|---|---|---|---|
| 3,961,371 | 6/1976 | Kobylarz | 360/107 X |
| 4,144,466 | 3/1979 | Hatch | 360/106 X |
| 4,200,894 | 4/1980 | Kaseta | 360/105 X |
| 4,408,238 | 10/1983 | Hearn | 360/104 |

Primary Examiner—A. J. Heinz
Attorney, Agent, or Firm—William J. Bethurum

[57] ABSTRACT

In order to improve servo system stability and decrease settling times in rotary head positioners for high performance magnetic disc drives, a floating mass damper is mounted on the end of an accessing head arm structure of the positioner opposite to the end or ends carrying the magnetic head or heads. The damper includes a spring centered floating mass which rests on a viscous film, such as silicone oil, and the shear forces developed by motion of the floating mass across the film dissipates vibrational mode energy in the accessing head arm structure during both a fast seek operation followed by track following fine servo operation. Such energy dissipation thus reduces the settling time and amplitude of natural resonance of the head positioner.

1 Claim, 2 Drawing Sheets

APPARATUS FOR DAMPING HEAD POSITIONERS FOR DISC DRIVES

CROSS REFERENCE TO RELATED APPLICATION

This application is a continuation of application Ser. No. 788,282, filed 10/16/85, now abandoned.

TECHNICAL FIELD

This invention relates generally to the control of magnetic head movement in high performance magnetic disc drives. More particularly, the invention is directed to the stabilization and control of mechanical resonances which occur in head positioners for such drives.

BACKGROUND ART

A disc drive is a rotating magnetic storage device capable of storing data which may by accessed at high speeds. This device includes a rotating, flat magnetic surface onto which data can be recorded and later retrieved, usually in milliseconds because of the high rotational rate of the disc and the fast radial accessing capability of the head positioner. The head positioner of the disc drive assembly functions to locate and maintain the magnetic read/write heads at a commanded track position above the disc, and this head positioner also provides precision support and stability which is necessary for the heads to function properly. Most disc drive designs are based upon the moving head principle as opposed to the faster, but more costly, "head per track" concept. Usually more than one disc or disc surface is used per drive, and in this case one or two seperate heads are used for accessing each disc surface. The heads for each surface are mounted on aligned arms of the positioner such that they all move in unison. The resulting head positioner structure looks like a comb and is often referred to the "head comb". The head comb is typically aligned and moved by a support and motor structure which is operative with either linear or rotary motion.

When a head positioner in a disc drive performs a very fast seek, many resonant or ringing modes of vibration can be excited and unless properly damped, will tend to ring for long periods of time, typically on the order of 100 miliseconds or more. Often the amplitude of these modes of vibration at the magnetic head position is a large percentage of the width of a data track on the magnetic disc. If this is the case, data reading or writing will be disabled until the ringing amplitude drops to a value sufficiently low to permit accurate reading or writing.

Disk drives having a high track density typically employ positioning servo schemes in order to ensure accurate and fast track locating by the magnetic heads. However, the accuracy and speed of such servo systems are highly dependant upon the mechanical system resonances. A servo system is a negative feedback control system in which part of the system is mechanical. An ideal control loop for such a servo system feeds the output signal of the system back to the input of the system and out of phase with the input thereto to force the system to exhibit a unity gain transfer function. When the servo system mechanics are introduced, mechanical resonances produce output signals greater than the input signals as well as produce shifted output signal phase relationships relative to the input signal.

Some compensation is customarily introduced into the servo control loop to provide improved stability with the mechanical system. But in spite of this compensation, mechanical resonances of the above type produced by head positioner vibrational resonances often are large enough and provide a phase shift of sufficient magnitude to create a positive feedback for the system at greater than unity gain. When this happens, the servo loop becomes unstable at that resonance frequency.

In the low performance disc drive industry, one practice has been to employ rotational dampers on stepper motors which ar used to drive head positioners for the disc drives. These dampers are used to increase the stability of the stepper motor per se. However, as presently known, these damping techniques of the prior art are not directed to the damping of vibrational resonances of an entire head positioner used in high performance track following servo disc drive actuators, as in the case with the present invention.

DISCLOSURE OF INVENTION

The general purpose of this invention is to provide a new and improved solution to the above problems resulting from vibrational resonances in head positioners for disc drives. This solution involves reducing the amplitude of resonance modes of vibration in the head positioner by providing a chosen movable floating mass at a selected location on the head positioner, ad this location exhibits large motions of the vibrating resonant modes in the head positioner. This mass is positioned in a liquid film of known viscosity, and the mass and film are located within a housing securely fixed to the head positioner at the selected location thereon. As the head positioner traverses its seeking path and abruptly comes toward a rest position, vibrational mode energy is coupled from the head positioner to the mass to thus cause the mass to move across the liquid film, thereby creating shear forces at the mass-film interface. These shear forces and the distance over which they act represent damper or energy loss that is removed from the vibration mode energy of the head positioner.

In a preferred embodiment of invention, the mass is centered via a soft-spring between opposite end walls of the housing, and vibrational energy received by the housing is viscously coupled to the mass at frequencies close or equal to the vibrational resonant frequencies of the head positioner. The spring only serves to keep the mass away from the end walls of the mass-housing, so that the damper mass remains functional regardless of its orientation relative to gravity.

Accordingly, an object of the present invention is to provide a novel damper apparatus which is easy to construct and which is particularly and uniquely adapted and well-suited for mounting on a head positioner for a disc drive.

Another object is to provide a new and improved damping method and apparatus which allows faster disc drive track locating times and wider bandwidth and higher performance of servo positioning systems associated therewith.

Another object is to provide a damping method and apparatus of the type described which dissipates energy from modes of head positioner vibration to thereby reduce settling time after a seek movement. Thus subsequent earlier reading and writing operations are achieved.

A further object is to provide a new and improved method and apparatus of the type described which improves associated servo control loop stability.

Another object is to provide a new and improved method and apparatus of the type described operative to improve servo and seek performance without the need to increase resonant frequencies which, in some cases, may not be possible.

These and other objects and features of this invention will become more readily apparent in the following description of the accompanying drawing.

BEST MODE FOR CARRYING OUT THE INVENTION

Figure 1A:
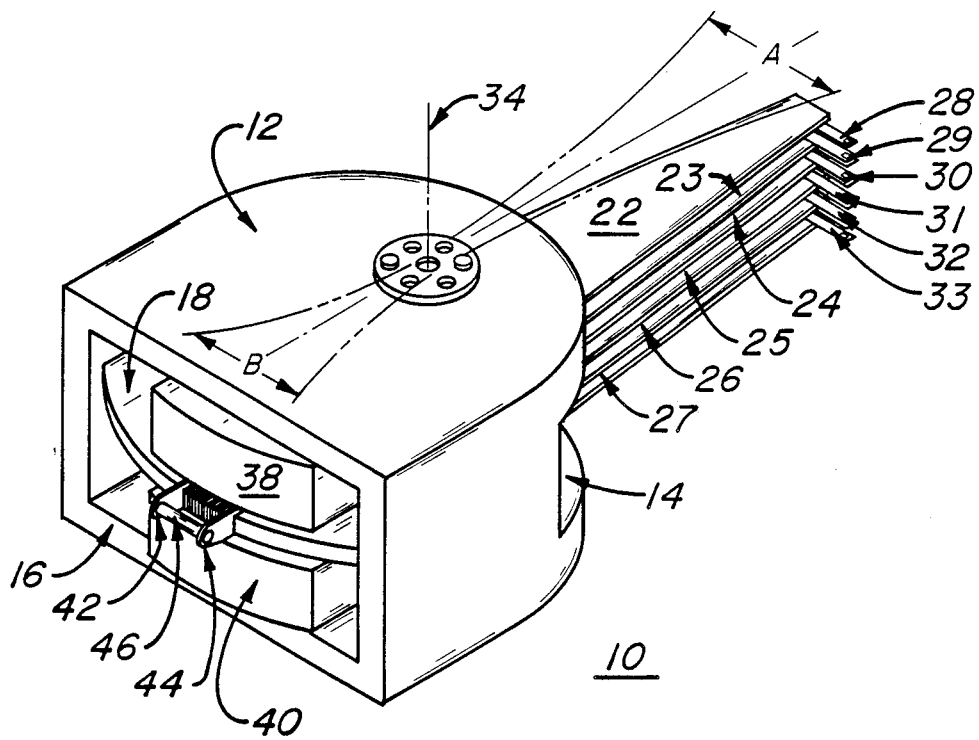
FIGS. 1A and 1B are isometric views (FIG. 1B partially cut away) of a head positioner and damping apparatus according to the invention.
Figure 1B:
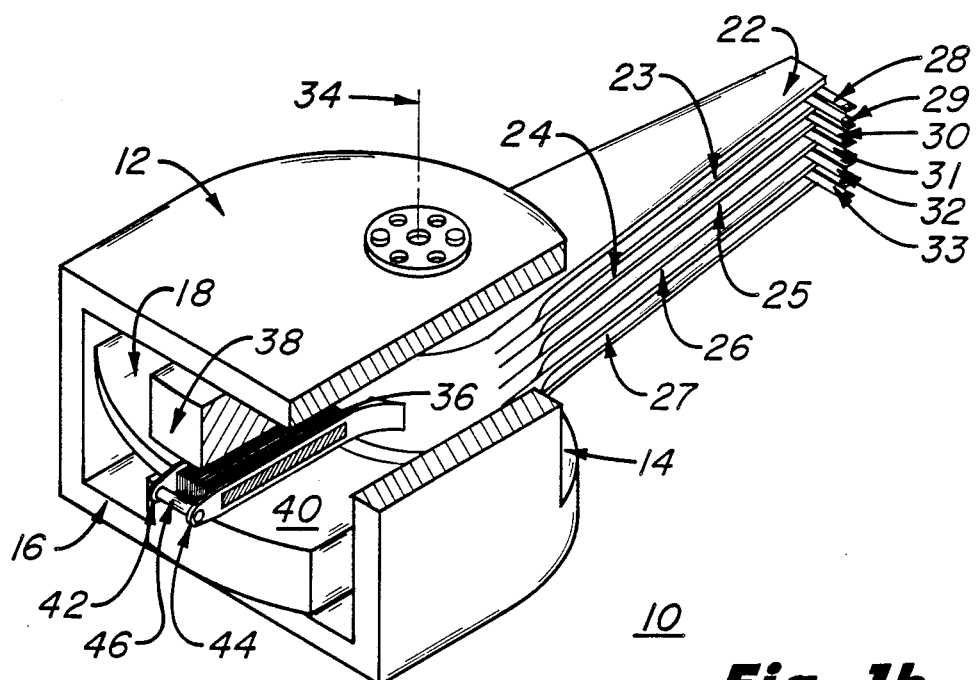

Referring now to FIGS. 1A and 1B, there is shown a rotary head positioner 10 including a motor and arm support structure 12 with front and back openings 14 and 16 respectively. The support structure 12 serves as a housing for a magnetic head accessing arm structure 18 which includes a plurality of accessing head arms 22, 23, 24, 25, 26 and 27 extending as shown out of the front opening 14 and having a plurality of magnetic heads 28, 29, 30, 31, 32 and 33 located on the ends of the accessing arms. The accessing head arm structure 18 is pivotally mounted within the support structure 12 on a vertical axis 34 about which it is driven with rotary motion at high speeds during a fast seek operation. Magnetic discs (not shown) are positioned in the openings between the magnetic heads 28, 29, 30, 31, 32 and 33, and these heads are driven to preselected positions on certain tracks of these discs during a fast seek operation.

The accessing head arm structure 18 is driven by a motor coil 36 which is mounted inside the housing 12 and on the head arm structure 18. This motor coil 36 is positioned as shown at the rear center of the accessing head arm structure 18. The motor coil 36 is also centered between upper and lower motor magnets 38 and 40, and includes a pair of end flanges 42 and 44 between which the motor coil is wound. A floating mass damper 46 is mounted as shown between these flanges 42 and 44.

Figure 2:
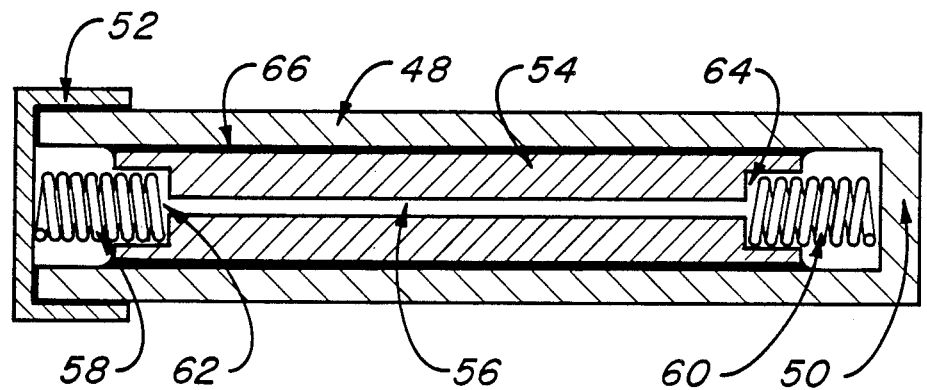
FIG. 2 is a cross-section view of the damping apparatus of FIG. 1.

Referring now to FIG. 2, the floating mass damper 46 is shown in more detail in a cross section view thereof and includes a cylindrical housing 48, typically of magnesium, having an end wall 50 and another removable wall or cap 52 which permits the loading therein of a floating damper mass 54. The floating damper mass 54 is typically non-magnetic stainless steel and has a central passage 56 along the longitudinal center line thereof and is centered in the housing 48 with a pair of soft centering springs 58 and 60. These springs extend between the opposite end walls 50 and 52 of the housing 48 and recessed or cavity regions 62 and 64 in the respective ends of the floating damper mass 54.

A viscous damping film 66 is provided as shown between the outer surface of the floating damper mass 54 and the interior surface of the housing 48, and this viscous damping film 66 will typically consist of silicone oil.

During a fast seek operation, the ends of the accessing head arms 22, 24 and 26 will typically undergo a resonant mode vibrational amplitude (greatly exaggerated) as indicated by the distance A in FIG. 1. When undergoing such a resonant mode vibration, the rotary head positioner 10 cannot become electrically useable until the value of A is reduced to near zero as the head arm vibration ceases. In accordance with the present invention, the floating mass damper 46 provides an elegantly simple solution to reducing the time required for the value of A to be reduced. In accordance with this invention, the floating mass damper 46 is mounted at the rear of the accessing head arm structure 18 and in a vertical plane with the dimension B. This dimension B corresponds to the maximum resonant mode vibration which the rear of the accessing head arm structure 18 will undergo during a fast seek operation and corresponding to the displacement A of the accessing head arms 22, 24 and 26. During the resonant mode vibration which produces the displacement B as indicated, the housing 48 is rapidly driven laterally back and forth across the viscous damping film 66. This movement of the housing 48 in cooperation with less movement of the floating damper mass 54 produces lateral shear forces which serve to substantially dissipate vibrational mode energy in the rotating accessing head arm structure 18. This energy dissipation thus quickly reduces the value of dimension B and maintains the value of B at a level much lower than it would otherwise have been in the absence of the floating mass damper 46.

Figure 3:
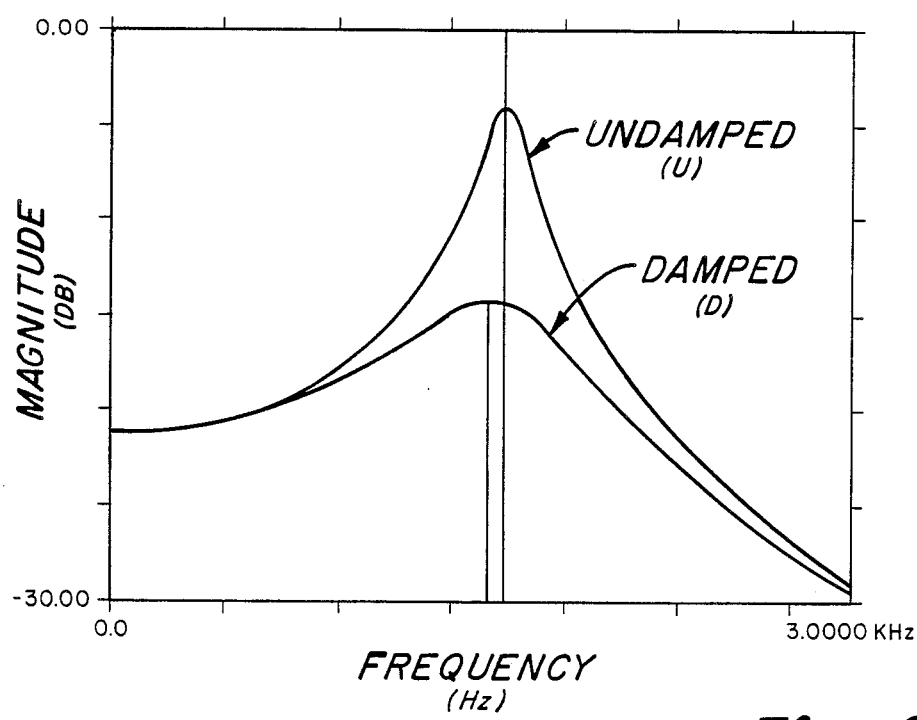
FIG. 3 is a graph plotting resonant mode amplitude in decibels resonant frequency for the damped (D) an undamped (U) head positioner to illustrate the reduction in resonant mode amplitude produced by the present invention.

Referring now to FIG. 3, there is shown a graph of the vibrational magnitude of the accessing head arm structure 18 as a function of vibration frequency. Line U of the curve in FIG. 3 represents the vibrational magnitude M without damping, whereas line D indicates the variation of M with frequency after damping. As shown in FIG. 3, the maximum point on the damped (D) curve will be slightly shifted (lowered) in frequency by a certain amount as a result of the damping action. Thus, this reduction in the magnification factor M as a result of employing the floating mass damper 46 substantially reduces the magnitude of the resonance values at A and B in FIG. 1 to more stably locate the magnetic heads 28, 29, 30, 31, 32 and 33 on preselected tracks of the magnetic discs previously described.

Thus, there has been described a new and improved method and appartus which is easy to construct and which is reliable and durable in operation and adds a relatively small increase in cost to the rotary head positioner 10. In contrast to the vastly more complex viscous damping systems of the prior art the floating mass damper 46 of the present invention employs only a single floating damper mass 54 which is spring centered using only a pair of springs 58 and 60 and generates substantial shear forces as the housing 48 moves over the viscous damping film 66. It has been determined that the reduction in settling time of the damped head positioner has been 5 to 10 times that of the undamped head positioner.

Various modifications may be made in the above described embodiment of the invention without departing from the scope of the appended claims. For example, for reasons of ease of assembly, it is often preferable to use a 3-piece construction for the accessing head arm structure 18. Thus, one piece may consist of the arms 22, 23, 24, 25, 26 and 27 integrally joined at one end; a second or center interlocking piece may be rotatably mounted at the axis 34 and mechanically interlocked with the accessing arms 22, 23, 24, 25, 26 and 27; and an end or motor coil support piece 41 may be mounted at the rear of center interlocking piece to facilitate bringing the motor coil 36 within the housing 12 and between the upper and lower motor magnets 38 and 40, respectively.

I claim:

1. In a head positioner apparatus for a magnetic disc drive wherein one or more track accessing arms are rotatably mounted on a chosen axis and have a point of maximum vibrational resonance amplitude at a certain distance from said chosen axis, the improvement comprising: a damper housing having interior walls receiving a viscous film and including a mass located on said viscous film, with said viscous film located between said interior walls and said mass for enabling movement of said mass on said viscous film regardless of the orientation of said head positioner apparatus with respect to gravity, said damper housing mounted on said track accessing arms a predetermined distance from said chosen axis and at a location for receiving a significant vibrational resonance amplitude from said track accessing arms.

* * * * *